United States Patent
Laufer et al.

(10) Patent No.: US 9,403,965 B2
(45) Date of Patent: Aug. 2, 2016

(54) PLASTICIZER FOR LOW TEMPERATURE UNWIND WITH WEIGHT RETENTION DURING HEAT AGING

(75) Inventors: Caroline H. Laufer, Millington, NJ (US); Robert F. Eaton, Belle Mead, NJ (US); Abhijit Ghosh-Dastidar, East Brunswick, NJ (US); Manish Mundra, Somerset, NJ (US); Bharat I. Chaudhary, Princeton, NJ (US); Jeffrey M. Cogen, Flemington, NJ (US); Lin Fu, Naperville, IL (US)

(73) Assignee: Dow Global Technologies LLC, Midland, MI (US)

( * ) Notice: Subject to any disclaimer, the term of this patent is extended or adjusted under 35 U.S.C. 154(b) by 138 days.

(21) Appl. No.: 14/344,421

(22) PCT Filed: Sep. 13, 2012

(86) PCT No.: PCT/US2012/055070
§ 371 (c)(1),
(2), (4) Date: Mar. 12, 2014

(87) PCT Pub. No.: WO2013/048752
PCT Pub. Date: Apr. 4, 2013

(65) Prior Publication Data
US 2014/0343201 A1    Nov. 20, 2014

Related U.S. Application Data

(60) Provisional application No. 61/541,847, filed on Sep. 30, 2011.

(51) Int. Cl.
*C08K 5/15* (2006.01)
*C08K 5/1515* (2006.01)
*C08K 5/00* (2006.01)
*C09D 127/06* (2006.01)
*H01B 3/44* (2006.01)

(52) U.S. Cl.
CPC ............. *C08K 5/1515* (2013.01); *C08K 5/0016* (2013.01); *C09D 127/06* (2013.01); *H01B 3/443* (2013.01); *C08K 2201/014* (2013.01)

(58) Field of Classification Search
CPC ............... C08K 5/0016; C08K 5/1515; C08K 2201/014
See application file for complete search history.

(56) References Cited

U.S. PATENT DOCUMENTS

| | | |
|---|---|---|
| 3,868,341 A | 2/1975 | Sauer et al. |
| 3,953,650 A | 4/1976 | Sauer et al. |
| 4,158,051 A * | 6/1979 | Greenberg ........... A01K 27/001 119/651 |
| 4,556,694 A | 12/1985 | Wallace |
| 4,983,665 A | 1/1991 | Backderf |
| 5,055,515 A | 10/1991 | Backderf |
| 5,057,367 A | 10/1991 | Morii et al. |
| 6,114,425 A | 9/2000 | Day et al. |
| 6,337,419 B1 | 1/2002 | Day et al. |
| 6,369,264 B2 | 4/2002 | Day et al. |
| 6,437,170 B1 | 8/2002 | Thil et al. |
| 6,534,575 B2 | 3/2003 | Day et al. |
| 6,797,753 B2 | 9/2004 | Benecke et al. |
| 2011/0076502 A1 | 3/2011 | Chaudhary et al. |
| 2012/0085568 A1 | 4/2012 | Eaton |
| 2012/0181056 A1 | 7/2012 | Chaudhary et al. |
| 2012/0181057 A1 * | 7/2012 | Chaudhary ............ C08K 5/103 174/110 V |
| 2012/0181058 A1 * | 7/2012 | Chaudhary .......... C08K 5/0091 174/110 V |
| 2012/0181061 A1 * | 7/2012 | Chaudhary ............. C08K 5/10 174/120 C |
| 2012/0276398 A1 * | 11/2012 | Chaudhary ............ C08K 5/103 428/463 |

FOREIGN PATENT DOCUMENTS

| | | | | |
|---|---|---|---|---|
| DE | WO 2011041363 A1 * | 4/2011 | ............. | C08K 5/103 |
| WO | 2009/102877 A1 | 8/2009 | | |
| WO | 2011/041372 A1 | 4/2011 | | |

* cited by examiner

*Primary Examiner* — Wenwen Cai
(74) *Attorney, Agent, or Firm* — Whyte Hirschboeck Dudek S.C.

(57) ABSTRACT

The present disclosure is directed to a plasticizer, polymeric compositions containing the plasticizer, and conductors coated with the polymeric composition. The plasticizer includes (i) an epoxidized fatty acid methyl ester, (ii) an epoxidized natural oil, and (iii) an epoxidized tallate ester. Polymeric compositions containing a polymeric resin and the plasticizer exhibit a weight loss less than 50 mg/cm$^2$ after exposure to 100° C. for seven days. Conductors coated with the polymeric composition (containing the plasticizer) pass the low temperature unwind test of UL719 and exhibit a weight loss less than 50 mg/cm$^2$ after exposure to 100° C. for seven days.

11 Claims, 1 Drawing Sheet

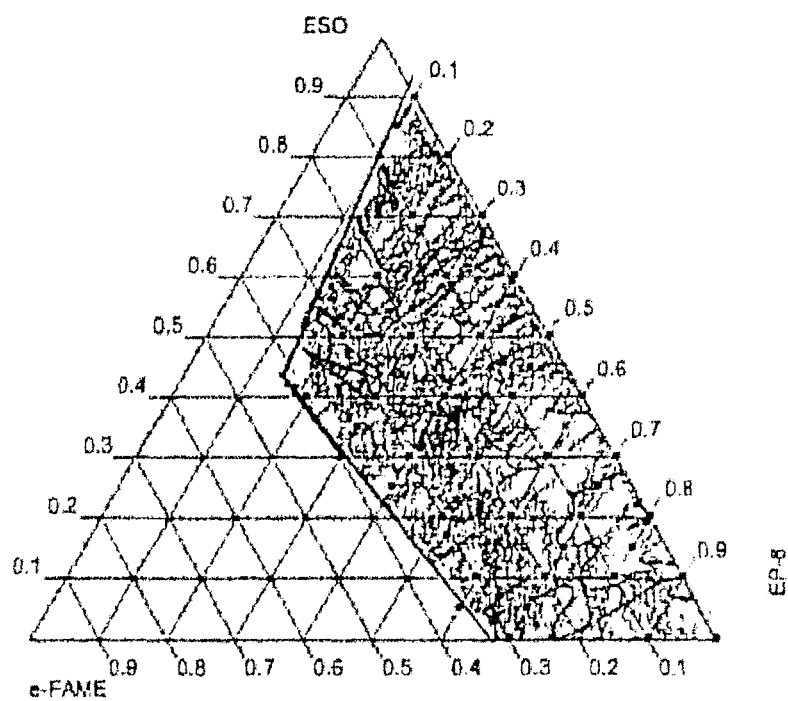

US 9,403,965 B2

PLASTICIZER FOR LOW TEMPERATURE UNWIND WITH WEIGHT RETENTION DURING HEAT AGING

CROSS REFERENCE TO RELATED APPLICATION

The present application is the national phase of PCT Patent Application No. PCT/US2012/055070 filed Sep. 13, 2012, which claims priority to U.S. Provisional Application No. 61/541,847, filed Sep. 30, 2011, the entire content of which is incorporated by reference herein.

BACKGROUND

Plasticizers are compounds or mixtures of compounds that are added to polymer resins to impart softness and flexibility. Phthalic acid diesters (also known as "phthalates") are known plasticizers in many flexible polymer products, such as polymer products formed from polyvinyl chloride (PVC) and other vinyl polymers. Examples of common phthalate plasticizers include di-isononyl phthalate (DINP), diallyl phthalate (DAP), di-2-ethylhexyl-phthalate (DEHP), dioctyl phthalate (DOP) and diisodecyl phthalate (DIDP). Other common plasticizers, used for high temperature applications, are trimellitates and adipic polyesters. Mixtures of plasticizers are often used to obtain optimum properties.

Phthalate plasticizers have recently come under intense scrutiny by public interest groups that are concerned about the negative environmental impact of phthalates and potential adverse health effects in humans (especially children) exposed to phthalates.

A known phthalate-free plasticizer for use in polyvinyl chloride (PVC) formulations is epoxidized soy oil. Unfortunately, epoxidized soy oil has limited solubility in PVC and insufficiently plasticizes PVC at low temperature (i.e., −20° C. and lower). PVC plasticized with epoxidized soy oil also exhibits a phenomenon called 'spew' which is a migration of the epoxidized soy oil to the PVC surface over time. Spew results in a more rigid PVC with a slippery surface. The spew phenomenon can result in brittleness and failure of the PVC.

The art recognizes the need to broaden applications for plasticized PVC that are phthalate-free, and/or plasticizers having less phthalate than conventional plasticizers. Accordingly, a need exists for a plasticizer with reduced, or no, phthalate for polymer resin which can withstand the low temperature unwind test. A need further exists for a plasticized polymeric composition with reduced, or no, phthalate, the polymeric composition having weight retention when exposed to temperature above ambient.

SUMMARY

The present disclosure is directed to a plasticizer, polymeric compositions containing the plasticizer, and conductors coated with the polymeric composition.

In an embodiment, a plasticizer is provided and includes (i) an epoxidized fatty acid methyl ester, (ii) an epoxidized natural oil, and (iii) an epoxidized tallate ester.

In an embodiment, a polymeric composition is provided and includes a polymeric resin and the plasticizer. The plasticizer includes (i) the epoxidized fatty acid methyl ester, (ii) the epoxidized natural oil, and (iii) the epoxidized tallate ester.

In an embodiment, the polymeric composition is formed into a plaque and has a weight loss less than 50 mg/cm$^2$ after exposure to 100° C. for seven days.

In an embodiment, a coated conductor is provided and includes a conductor and a coating on the conductor. The coating is formed from the polymeric composition. The polymeric composition includes the polymeric resin and the plasticizer composed of (i) the epoxidized fatty acid methyl ester, (ii) the epoxidized natural oil, and (iii) the epoxidized tallate ester.

In an embodiment, the coating of the coated conductor has a weight loss less than 50 mg/cm$^2$ after exposure to 100° C. for seven days.

In an embodiment, the coated conductor passes the low temperature unwind test as determined in accordance with UL719.

An advantage of the present disclosure is a phthalate-free plasticized polymeric composition with that passes the UL719 low temperature unwind test.

An advantage of the present disclosure is a phthalate-free plasticized polymeric composition with less than 50 mg/cm$^2$ weight loss after 7 days (168 hours) at 100° C.

An advantage of the present disclosure is a coating for wire and cable that is phthalate-free.

DETAILED DESCRIPTION

1. Plasticizer

The present disclosure provides a plasticizer composed of an epoxidized fatty acid alkyl ester, an epoxidized natural oil, and an alkyl epoxy ester. A "plasticizer" is a substance that lowers the modulus and tensile strength, and increases flexibility, elongation, impact strength, and tear strength of the polymeric resin (typically a thermoplastic polymer) to which it is added. A plasticizer may also lower the melting point of the polymeric resin, which lowers the glass transition temperature and enhances processability of the polymeric resin to which it is added. In an embodiment, the present plasticizer is a phthalate-free plasticizer, or is otherwise void of phthalate.

The plasticizer includes an epoxidized fatty acid alkyl ester. The alkyl moiety of the ester may be a methyl group, an ethyl group, a propyl group, or a 2-ethylhexyl group. In an embodiment, the epoxidized fatty acid alkyl ester is an epoxidized fatty acid methyl ester (or "eFAME"). A "fatty acid methyl ester" is a $C_4$-$C_{24}$ (saturated or unsaturated) carboxylic acid methyl ester with at least one epoxide group. An "epoxide group" is a three-member cyclic ether (also called oxirane or an alkylene oxide) in which an oxygen atom is joined to each of two carbon atoms that are already bonded to each other. Epoxidation reactions are typically performed with percarboxylic acids or other peroxy compounds.

A nonlimiting example for preparing eFAME begins with a soy oil (a natural oil). The soy oil is transesterified with methanol to make the methyl ester of the fatty acids in the oil. Esterification is a process in which two reactants, typically an acid (such as a fatty acid) and an alcohol, are reacted with one another to form an ester. Transesterification is the process of exchanging the organic group R" of an ester with the organic group R' of an alcohol. Glycerol is removed from the reaction product due to insolubility. A solution of per-acetic acid in ethyl acetate is used to epoxidize the double bonds on the fatty acids. After completion, the ethyl acetate and per-acetic acid are removed via vacuum stripping.

The present plasticizer also includes an epoxidized natural oil. A "natural oil," as used herein, is an oil composed of fatty acid triglycerides and derived from a microbe (algae, bacteria), a plant/vegetable, and/or a seed. In an embodiment, natural oil includes genetically-modified natural oil. In another embodiment, the natural oil excludes petroleum-derived oil. Nonlimiting examples of suitable natural oils include beef tallow oil, canola oil, castor oil, corn oil, fish oil, linseed oil, palm oil, rapeseed oil, safflower oil, soy oil, sunflower oil, tall oil, tung oil, and any combination thereof.

The term "epoxidized natural oil," (or "eNO") as used herein, is a natural oil wherein at least one fatty acid moiety contains at least one epoxide group. Epoxidation may occur by way of reaction of the natural oil with percarboxylic acid and/or other peroxy compounds. The natural oil may also be esterified or trans-esterified.

Nonlimiting examples of suitable eNO include epoxidized algae oil, epoxidized beef tallow oil, epoxidized canola oil, epoxidized castor oil, epoxidized corn oil, epoxidized fish oil, epoxidized linseed oil, epoxidized palm oil, epoxidized rapeseed oil, epoxidized safflower oil, epoxidized soy oil, epoxidized sunflower oil, epoxidized tall oil, epoxidized tung oil, and any combination thereof.

In an embodiment, the epoxidized natural oil is an epoxidized soy oil (eSO).

The present plasticizer also includes an alkyl epoxy ester. Suitable alkyl epoxy esters include alkyl epoxy soyate (propyl, heptyl, or nonyl epoxy soyate), and epoxidized tallate ester.

In an embodiment, the present plasticizer includes an epoxidized tallate ester (eTE). An "epoxidized tallate ester," as used herein, is an ester derived from tall oil, the ester containing at least one epoxide group. Tall oil is typically produced by refining rosin obtained from pine trees. Tall oil is a mixture of rosins, abietic acid, fatty acids (mainly palmitic acid, oleic acid and linoleic acid), sterols, high-molecular weight alcohols and other alkyl chain materials. Nonlimiting examples of suitable eTE include 2-ethylhexyl epoxytallate, such as Drapex™ 4.4 from Artek Surfin Chemicals Ltd, and octyl epoxytallate, such as Flexol™ EP-8 available from Union Carbide Chemicals and Plastics Company Inc., and combinations thereof.

In an embodiment, the eTE is 2-ethylhexyl epoxytallate.

In an embodiment, the eTE is octyl epoxytallate.

In an embodiment, the plasticizer contains from 1 wt % to 75 wt % eFAME, from 10 wt % to 90 wt % eSO, and from 10 wt % to 89 wt % epoxidized tallate ester (eTE). In a further embodiment, the plasticizer contains from 30 wt % to 40 wt % eFAME, from 50 wt % to 40 wt % eSO, and 20 wt % eTE. The components are present to provide 100 wt % plasticizer. Weight percent is based on total weight of the plasticizer.

In an embodiment, the present plasticizer is phthalate-free.

The present plasticizer may comprise two or more embodiments disclosed herein.

2. Polymeric Composition

The present disclosure provides a polymeric composition. In an embodiment, a polymeric composition is provided which includes a polymeric resin and the present plasticizer as disclosed above.

Nonlimiting examples of suitable polymeric resins include polysulfides, polyurethanes, acrylics, epichlorohydrins, nitrile rubber, chlorosulfonated polyethylene, chlorinated polyethylene, polychloroprene, styrene butadiene rubber, natural rubber, synthetic rubber, EPDM rubber, propylene-based polymers, ethylene-based polymers, and vinyl chloride resins. The term, "propylene-based polymer," as used herein, is a polymer that comprises a majority weight percent polymerized propylene monomer (based on the total amount of polymerizable monomers), and optionally may comprise at least one polymerized comonomer. The term, "ethylene-based polymer," as used herein, is a polymer that comprises a majority weight percent polymerized ethylene monomer (based on the total weight of polymerizable monomers), and optionally may comprise at least one polymerized comonomer.

The term "vinyl chloride resin," as used herein, is a vinyl chloride polymer, such as polyvinyl chloride (PVC), or a vinyl chloride copolymer such as vinyl chloride/vinyl acetate copolymer, vinyl chloride/vinylidene chloride copolymer, vinyl chloride/ethylene copolymer or a copolymer prepared by grafting vinyl chloride onto ethylene/vinyl acetate copolymer. The vinyl chloride resin can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer or acrylonitrile-butadiene-styrene polymer (ABS).

In an embodiment, the vinyl chloride resin is polyvinyl chloride (PVC). PVC is known to be thermoplastic, as opposed to thermoset.

In an embodiment, the polymeric composition includes from 30 wt %, or 40 wt % to 50 wt % vinyl chloride resin, from 10 wt % to 30 wt % plasticizer, from 0 wt %, or greater than 0 wt % to 35 wt % filler, from 0 wt %, or greater than 0 wt % to 5 wt % metal soap stabilizer, and from 0 wt %, or greater than 0 wt % to 1 wt % antioxidant. The components are present to 100 wt %. Weight percent is based on total weight of the polymeric composition.

In an embodiment, the polymeric composition includes from 40 wt % to 50 wt % PVC, from 5 wt % to 15 wt % eFAME, from 5 wt % to 15 wt % eNO, from 2 wt % to 10 wt % eTE, and from 25 wt % to 35 wt % filler.

In an embodiment, the polymeric composition has a weight loss of less than 50 mg/cm$^2$ after 7 days (168 hours) at 100° C.

In an embodiment, the polymeric composition includes 40-50 wt % vinyl chloride resin, 5-15 wt % eFAME; 5-15 wt % eSO; 2-10 wt % 2-ethylhexyl epoxytallate, octyl epoxytallate, and a mixture thereof; and greater than 0 wt % to 35 wt % filler. Weight percent is based on total weight of the polymeric composition.

3. Additives

The polymeric composition may include one or more of the following optional additives: a filler, a flame retardant, a heat stabilizer, an anti-drip agent, a colorant, a lubricant, a low molecular weight polyethylene, a hindered amine light stabilizer, a UV light absorber, a curing agent, a booster, a retardant, a processing aid, a coupling agent, an antistatic agent, a nucleating agents, a slip agent, a viscosity control agent, a tackifier, an anti-blocking agent, a surfactant, an extender oil, an acid scavenger, a metal deactivator, and any combination thereof.

In an embodiment, the polymeric composition includes PVC, the present plasticizer, a filler (calcium carbonate, clays, silica, and any combination thereof), metal soap stabilizers (zinc stearate or mixed metal stabilizers containing Ca, Zn, Mg, Sn, and any combination thereof), a phenolic or related antioxidant, and a processing aid.

The present polymeric composition(s) may comprise two or more embodiments disclosed herein.

4. Coated Conductor

The present disclosure provides a coated conductor. The coated conductor includes a conductor and a coating on the conductor, the coating formed from the polymeric composition described above.

A "conductor," as used herein, is one or more wire(s) or fiber(s) for conducting heat, light, and/or electricity. The conductor may be a single-wire/fiber or a multi-wire/fiber and may be in strand form or in tubular form. Nonlimiting examples of suitable conductor include metals such as silver, gold, copper, carbon, and aluminum. The conductor may also be optical fiber made from either glass or plastic.

The coated conductor may be flexible, semi-rigid, or rigid. The coating (also referred to as a "jacket" or a "sheath" or "insulation") is on the conductor or on another polymeric layer around the conductor.

In an embodiment, the coating of the coated conductor has a weight loss of less than 50 mg/cm$^2$ after exposure to 100° C. for seven days.

In an embodiment, the coated conductor passes the low temperature unwind test as determined in accordance with UL719.

The present coated conductor may comprise two or more embodiments disclosed herein.

Applicant has surprisingly discovered that the present plasticizer composed of eFAME, eNO, and eTE unexpectedly provides a plasticizer compatible (soluble in) with PVC that does not migrate out of a thermoplastic polymer (PVC) in which it is incorporated. The present plasticizer is particularly suitable for low temperature wire and cable applications. Bounded by no particular theory, it is believed that blending the eTE with the eNO and the eFAME improves the solubility of the present plasticizer in the vinyl chloride resin which improves weight retention and reduces, or eliminates, spew. In addition, the long tail of the eTE contributes to sub-Tg (glass transition temperature) molecular-motions in the plasticized polymeric composition. The "sub-Tg molecular motions" are "kink" motions of the CH$_2$ groups along the polymer backbone. The sub-Tg molecular motions disperse the stress (i.e., dissipate the energy) induced by the LTUW test.

Definitions

The terms "comprising", "including", "having" and their derivatives do not exclude the presence of any additional component, or procedure. The term, "consisting essentially of" excludes any other component or procedure, except those essential to operability. The term "consisting of" excludes any component, procedure not specifically stated.

In an embodiment, the compositions disclosed herein are phthalate-free. The term "phthalate-free composition," as used herein, is a composition devoid of phthalate or is otherwise free of phthalate. A "phthalate," is a compound which includes the following structure (I):

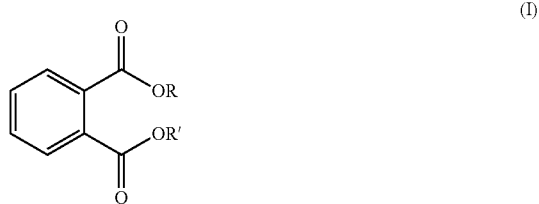

wherein R and R' may be the same or different.

Test Methods

Dynamic storage modulus (G') is determined by dynamic mechanical analysis (DMA) using a TA Instrument AR1000N Rheometer having DMA fixtures. The specimen is in the form of a rectangular solid and tested in tension mode. The temperature is varied from −100° C. to +160° C. at a ramp rate of 5° C./min, and the test frequency is held constant at 6.283 rad/s (1 Hz). The storage and loss modulus of the sample, as well as the tan delta, are measured as a function of the temperature. Dynamic storage modulus (G') at −20° C. is used as a measure of low temperature flexibility. The storage and loss modulus of viscoelastic materials are measures of the stored energy (representing the elastic portion) and the energy dissipated as heat (representing the viscous portion).

Low Temperature Unwind (LTUW) test is determined in accordance with Underwriters Laboratories (UL) standard UL 719. The term "UL 719" is Underwriters Laboratories Reference Standard for Safety of Nonmetallic-Sheathed Cables. UL 719—Unwinding Tests for Low Temperature provides test protocol to assess the integrity of coated cable wound upon a mandrel at −25.0° C.±1.0° C. Any cable from which a specimen exhibits any of the damage described below is not acceptable and does not pass the test:

Inside and outside surface cracks, tears, splits, or other openings are not to be in the insulation, individual covering over the insulation (nylon jacket or protective sheath), or in the PVC jacket.

There is not to be any internal cracking of the insulation or PVC jacket.

Internal cracks are those within the thickness of the insulation or jacket as evidenced by slight depressions in the outer surface.

Weight loss after 7 Days (168 hours) at 100° C. is measured on specimens of 1.25 inch diameter that are cut from 30 mil thick molded plaques.

Some embodiments of the present disclosure will now be described in detail in the following Examples.

EXAMPLES

1. Polymeric Compositions

The polymeric compositions provided in Table 1 and Table 2 are prepared as follows.

Sigma blades are used to dry blend the mixture before melt mixing with CAM blades used to melt mix the entire formulation at high temperatures. The CAM blade is an intermeshing 'bow tie' configuration to impose high shear in the melt mixing step. The plasticizers are preheated at 60° C. for a minimum of 1 hour and agitated before use. The purpose of this step is to homogenize the plasticizer as much as possible in case any crystallization, aggregation, or settling occurs at room temperature during storage. The plasticizer is then premixed in a glass jar, then placed on the roller for 3 minutes. A "solids mixture" is made by mixing all the ingredients (Shown in Tables 1 and 2) except for the plasticizer and filler in a container using a spatula. The Brabender mixing bowl with sigma blades is warmed up for 2 minutes at 90° C. and 40 rpm. The solids mixture is then added to the bowl and mixed for 30 seconds.

The plasticizer is then slowly added and mixed until full plasticizer absorption is achieved (varies with plasticizer). Plasticizer absorption time is determined by visually observing the mixing through the opening at the top of the bowl. The time for complete absorption for each plasticizer is recorded. The filler is then added to the bowl and mixed for 60 seconds. The Brabender mixer is then stopped to remove the dry blend. The sigma blades are removed and replaced with CAM blades. The bowl is then preheated at 180° C. and, the motor speed is set to 40 rpm. The dry blend is added and mixed for 120 seconds after PVC is melted. All parameters such as melt temperature, pressure, rpm, etc. are recorded. Melted compound is removed and cooled down immediately.

2. Extrusion

Samples are extruded onto nylon rope with 30 mil wall thickness using the following processing conditions on a C. W. Brabender with 24:1 extruder:

160-165-170-175° C., 20 RPM, and 3.4 ft/min.

Miniwire line with 160-165-170-175° C. temp profile

3. UL719—Low Temperature Unwind Test

Following the example in the UL719, a cold chamber is used and set at −25° C. for 4 hours. The extruded specimen is wound around a mandrel of ½″ diameter. After 4 hours, the specimen is unwound at 5 turns per minute and examined for any cracking.

Runs 1-7 are polymeric compositions prepared as described above and set forth in Table 1 below.

TABLE 1

| Run # | 1 | 2 | 3 | 4 | 5 | 6 | 7 |
|---|---|---|---|---|---|---|---|
| Material | phr | phr | phr | phr | phr | phr | phr |
| PVC | 100 | 100 | 100 | 100 | 100 | 100 | 100 |
| CaCO3 (Q1T) | 68 | 68 | 68 | 68 | 68 | 68 | 68 |
| eFAME | 27.5 | 22 | 16.5 | 27.5 | 22 | 27.5 | 24.75 |
| ESO | 22 | 27.5 | 27.5 | 16.5 | 22 | 27.5 | 24.75 |
| Drapex ™ 4.4* | 5.5 | 5.5 | 11 | 11 | 11 | 0 | 5.5 |
| Zn Stearate | 3 | 3 | 3 | 3 | 3 | 3 | 3 |
| Irganox ® 1076 | 0.1 | 0.1 | 0.1 | 0.1 | 0.1 | 0.1 | 0.1 |
| Total (phr) | 226.1 | 226.1 | 226.1 | 226.1 | 226.1 | 226.1 | 226.1 |
| UL719 (pass/fail) | Fail | Fail | Pass | Pass | Pass | Fail | Fail |
| Wt loss less than 50 mg/cm² (yes/no) | No | Yes | Yes | Fail | Yes | No | Yes |

*2-ethylhexyl epoxytallate

In Table 1, the polymeric compositions of Runs 3, 4, 5 are examples of an embodiment of the present disclosure. Runs 3, 4, and 5 each pass the Low Temperature Unwind Test as measured in accordance with UL719.

In Table 1, the polymeric compositions of Runs 2, 3 and 7 are examples of an embodiment of the present disclosure. Each of Runs 2, 3, and 7 show weight loss less than 50 mg/cm² after exposure to 100° C. for seven days.

In Table 1, the polymeric compositions of Runs 3 and 5 are examples of an embodiment of the present disclosure. Each of Runs 3 and 5 pass the Low Temperature Unwind Test (UL719) and show weight loss less than 50 mg/cm² after exposure to 100° C. for seven days.

In Table 1, Run 6 is a comparative sample. The polymeric composition of Run 6 does not include an eTE. In addition, Run 6 fails to pass the Low Temperature Unwind Test of UL 719. Run 6 also has a weight loss greater than 50 mg/cm² after exposure to 100° C. for seven days.

4. Target representations of Examples

Another polymeric composition is provided in Table 2 below and is prepared as disclosed above.

TABLE 2

| Polymeric composition | |
|---|---|
| Material | Wt % |
| PVC | 44.7 |
| CaCO3 (Q1T) | 30.6 |
| Plasticizer | 24.7 |
| (A) eFAME (per FIG. 1) | |
| (B) ESO (per FIG. 1) | |
| (C) EP-8** (per FIG. 1) | |
| Total (wt %) | 100 |

**octyl epoxytallate

Applicant unexpectedly discovered that plasticizer composed of (A) eFAME, (B) eSO and (C) EP-8 that meets Target 1, Target 2 and Target 3 and is the plasticizer of polymeric composition of Table 2 produces a polymeric composition that passes both (i) the UL719 LTUW test and (ii) has a 7 day weight loss at 100° C. of less than 50 milligrams/cm². Target 1, Target 2, and Target 3 are provided below.

$$1.0 \times 10^9 > (78.74*((A-0.3)/0.4)) + (30.29*((B-0.3)/0.4)) + (38.81*((C)/0.4)) \quad \text{Target 1}$$

$$50.0 > (1296000000*((A-0.3)/0.4)) + (1174700000*((B-0.3)/0.4)) + (612160000*((C)/0.4)) \quad \text{Target 2}$$

$$A+B+C=1, \quad \text{Target 3}$$

wherein
A=wt fraction eFAME in the plasticizer
B=wt fraction eSO in the plasticizer
C=wt fraction eTE=3 in the plasticizer Plasticizers that are a blend of (A) eFAME, (B) eSO and (C) eTE meeting Target 1, Target 2, and Target 3 are shown in the shaded region of FIG. 1 below. FIG. 1 is a ternary representation showing the weight fraction of (A) eFAME, (B) eSO, and (C) eTE present in the plasticizer. Plasticizers in the shaded region of FIG. 1 (i) enable the composition of Table 2 to pass the UL719 LTUW test and (ii) provide the composition of Table 2 to have a 7 day weight loss at 100° C. of less than 50 milligrams/cm².

Ternary plasticizers (plasticizers with three plasticizing components) typically are not applied to polymeric compositions due to the complex interactions between the three components. Component interaction is even further complicated when using one or more bio-based components in the plasticizer. Applicant discovered a ternary plasticizer that, when added to PVC, unexpectedly yields a PVC polymer composition that exhibits less than 50 mg/cm² weight loss when exposed to 100° C. for 7 days. When applied as a coating on a conductor, the present plasticized PVC polymeric composition passes the LTUW test as determined by UL719. The results of acceptable LTUW test (UL719) and less than 50 mg/cm² weight loss when exposed to 100° C. for 7 days provided by the present ternary plasticizer is unexpected and unpredictable.

The invention claimed is:

1. A polymeric composition comprising:
  from 40 wt % to 50 wt % of a vinyl chloride resin;
  from 5 wt % to 15 wt % of epoxidized fatty acid methyl ester;
  from 5 wt % to 15 wt % of epoxidized natural oil;
  from 2 wt % to 10 wt % of epoxidized tallate ester;
  from greater than 0 wt % to 35 wt % of a filler; and
  the polymeric composition is phthalate-free and passes the low-temperature unwind test as measured in accordance with UL 719 or when formed into a plaque has a weight loss less than 50 mg/cm² after exposure to 100° C. for seven days.

2. The polymeric composition of claim 1 wherein
  the epoxidized natural oil is an epoxidized soy oil; and
  the epoxidized tallate ester is selected from the group consisting of 2-ethylhexyl epoxytallate, octyl epoxytallate, and combinations thereof.

3. The polymeric composition of claim 1 comprising from 25 wt % to 35 wt % of the filler.

4. The polymeric composition of claim 1 formed into a plaque and having a weight loss less than 50 mg/cm² after exposure to 100° C. for seven days.

5. The polymeric composition of claim 1 wherein the polymeric composition passes the low-temperature unwind test as measured in accordance with UL 719.

6. The polymeric composition of claim 1 wherein the polymeric composition passes the low-temperature unwind test as measured in accordance with UL 719 and when the polymeric composition is formed into a plaque has a weight loss less than 50 mg/cm² after exposure to 100° C. for seven days.

7. The polymeric composition of claim 6 wherein the epoxidized natural oil is an epoxidized soy oil; and
the epoxidized tallate ester is selected from the group consisting of 2-ethylhexyl epoxytallate, octyl epoxytallate, and combinations thereof.

8. The polymeric composition of claim 7 comprising
from 5 wt % to 15 wt % of epoxidized fatty acid methyl ester;
from 5 wt % to 15 wt % of epoxidized soybean oil;
from 2 wt % to 10 wt % of epoxidized tallate ester; and
from 25 wt % to 35 wt % of a filler.

9. A coated conductor comprising:
a conductor; and
a coating on the conductor, the coating formed from the polymeric composition of claim 1.

10. The coated conductor of claim 9 wherein the coating has a weight loss less than 50 mg/cm² after exposure to 100° C. for seven days.

11. The coated conductor of claim 9 wherein the coated conductor passes the low temperature unwind test as determined in accordance with UL 719.

\* \* \* \* \*